(12) United States Patent
Johansson

(10) Patent No.: US 10,457,527 B2
(45) Date of Patent: Oct. 29, 2019

(54) OPERATION DEVICE FOR MANUAL CONTROL OF A LOAD SUSPENDED IN THE OPERATION DEVICE

(71) Applicant: Binar Quick-Lift Systems AB, Trollhättan (SE)

(72) Inventor: Niclas Johansson, Trollhättan (SE)

(73) Assignee: BINAR QUICK-LIFT SYSTEMS AB, Trollhattan (SE)

( * ) Notice: Subject to any disclaimer, the term of this patent is extended or adjusted under 35 U.S.C. 154(b) by 1083 days.

(21) Appl. No.: 14/851,142

(22) Filed: Sep. 11, 2015

(65) Prior Publication Data

US 2016/0075538 A1 Mar. 17, 2016

(30) Foreign Application Priority Data

Sep. 12, 2014 (SE) ...................................... 1451053

(51) Int. Cl.
*B66D 3/18* (2006.01)
*B66C 13/18* (2006.01)
(Continued)

(52) U.S. Cl.
CPC ............... *B66C 13/18* (2013.01); *B66D 1/40* (2013.01); *B66D 3/18* (2013.01); *G01D 11/24* (2013.01)

(58) Field of Classification Search
CPC .... B66D 1/42; B66D 3/18; B66D 3/26; B66C 3/18; G01D 11/24; G01D 5/10; G01D 5/125; H04L 27/2602
See application file for complete search history.

(56) References Cited

U.S. PATENT DOCUMENTS 3,654,549 A 4/1972 Maurer
3,921,959 A * 11/1975 Ulbing ..................... B66D 3/18
254/270

(Continued)

FOREIGN PATENT DOCUMENTS

DE   195 45923   1/1996
EP   0 823 560   9/1997
(Continued)

*Primary Examiner* — Emmanuel M Marcelo
(74) *Attorney, Agent, or Firm* — Jeffrey S. Melcher; Melcher Patent Law PLLC

(57) ABSTRACT

Provided are a method and an operation device for a manual control of a load suspended in the operations device (2) having a housing (20); a first connection device (5), at least indirectly carried by the housing (20), for the connection of the operation device (2) to a device for the lifting and lowering of the operation device (2) with its suspended load; a second connection device (21), at least indirectly carried by the housing, for the connection of the operation device (2) to the load which is to carried by the operation means; a handle (22), which is movably arranged in relation to the housing (20) and the load connection device (21) and which has a rest position between two end positions; a sensor (4) arranged inside the housing (20) for the detection of a motion by the handle (22) in relation to the housing (20) and the load connection device (21), which sensor (4) emits a signal corresponding to the movement of the handle (23) from its rest position; a control unit for receiving the signal and as a result thereof control the lifting and lowering of the operation device (2) with its suspended load, wherein the sensor (4) is an electromagnetic induction sensor.

18 Claims, 3 Drawing Sheets

(51) Int. Cl.
  *B66D 1/40* (2006.01)
  *G01D 11/24* (2006.01)

(56) References Cited

U.S. PATENT DOCUMENTS

| | | | | |
|---|---|---|---|---|
| 3,945,612 A * | 3/1976 | Motoda | B66C 23/005 | |
| | | | 254/269 | |
| 4,844,421 A * | 7/1989 | Kojima | B66C 13/56 | |
| | | | 254/270 | |
| 4,917,360 A * | 4/1990 | Kojima | B66C 13/56 | |
| | | | 200/298 | |
| 5,772,184 A * | 6/1998 | Zaguroli, Jr. | B66D 3/18 | |
| | | | 251/294 | |
| 5,865,426 A * | 2/1999 | Kazerooni | B66C 1/62 | |
| | | | 212/285 | |
| 5,915,673 A * | 6/1999 | Kazerooni | B66C 1/62 | |
| | | | 212/285 | |
| 6,386,513 B1 * | 5/2002 | Kazerooni | B66C 1/0212 | |
| | | | 212/285 | |
| 6,595,493 B2 * | 7/2003 | Krebs | B66C 13/44 | |
| | | | 254/266 | |
| 6,634,621 B2 * | 10/2003 | Keith | B66C 23/022 | |
| | | | 254/270 | |
| D543,334 S * | 5/2007 | Helmetsie | D34/35 | |
| 7,222,839 B2 * | 5/2007 | Taylor | B66D 1/485 | |
| | | | 242/563 | |
| 7,467,723 B2 * | 12/2008 | Zaguroli, Jr. | B66C 9/14 | |
| | | | 212/331 | |
| 7,810,791 B2 * | 10/2010 | Devos | B66D 3/18 | |
| | | | 212/285 | |
| 7,832,711 B2 * | 11/2010 | Miyoshi | B66D 3/18 | |
| | | | 212/285 | |
| 8,157,113 B2 * | 4/2012 | Golder | B66D 1/46 | |
| | | | 212/284 | |
| 9,403,664 B2 * | 8/2016 | Ogawa | B66C 13/44 | |
| 9,643,322 B2 * | 5/2017 | Freitag | B25J 13/02 | |
| 2006/0151765 A1 * | 7/2006 | Kazerooni | B60R 5/04 | |
| | | | 254/275 | |
| 2007/0205405 A1 * | 9/2007 | Stockmaster | B66D 3/18 | |
| | | | 254/275 | |
| 2013/0105749 A1 * | 5/2013 | Gaillard | B66D 1/42 | |
| | | | 254/266 | |

FOREIGN PATENT DOCUMENTS

| | | |
|---|---|---|
| FR | 2943651 | 3/2009 |
| GB | 2 011 629 | 7/1979 |
| SE | 453589 | 5/1985 |
| SE | 1351174 | 5/2005 |

* cited by examiner

OPERATION DEVICE FOR MANUAL CONTROL OF A LOAD SUSPENDED IN THE OPERATION DEVICE

FIELD OF THE INVENTION

The present invention relates to an operation device for manual control of a load suspended by the operations device, which comprises:
a) a housing;
b) a first connection means, at least indirectly carried by the housing, for the connection of the operation to a device for the lifting and lowering of the operation device with its suspended load;
c) a second connection means, at least indirectly carried by the housing, for the connection of the operation device to the load which is to carried by the operation means;
d) a handle, which is movably arranged in relation to the housing and the load connection device and which has a rest position between two end positions;
e) a sensor arranged inside the housing for the detection of a motion by the handle in relation to the housing and the load connection means, which sensor emits a signal corresponding to the movement of the handle from its rest position;
f) a control unit for receiving the signal and as a result thereof controling the lifting and lowering of the operation device with its suspended load.

BACKGROUND OF THE INVENTION

SE 453,589 describes a device with a load lift, comprising an operation device, which can be influenced by a driving means, and which is located between a load and the driving means. The driving means comprises a rotary magnet motor, which is arranged to be controlled by electronics or other means and which can be connected to a sensor in the form of a piezoelectric crystal included in said manually easily influenced operation means. The device is simple and functions effectively without any requirements for a large muscular strength with the user. However, this construction implies that force is transmitted directly from the handle to the sensor, which may imply problems, above all as the sensor thereby easily can be damaged because of an overload. Further, it is difficult to reach an even sensitivity, and therefore the running action may be uneven.

Also, SE 453,589 describes a device with a load lift, comprising an operation means, which can be influenced by a driving means, and which is situated between a load and the driving means. Here, the driving means is arranged so that it is influenced by the lateral motion of the lifting wire rope in order to be able to move the carried load with the associated load in the corresponding direction at the desired occasions, e.g. when the loading staff is manually operating the load and influences the same in the direction which you want to move the load by means of the driving means in question. Potentiometers are mentioned as an example of position sensor s.

Sensor s operating without any appreciable force being transmitted from a movable component to the sensor are previously known. For instance, DE 195 45,923 A1 describes an inductive sensor in the form of a piston-cylinder device, where the piston comprises a through-hole where a ferromagnetic core is arranged. The core is surrounded by three coils. The axial motion between the piston and the cylinder creates a relative movement between the core and the coils, which is used for the measurement of the piston strokes. Similar sensor s are known through U.S. Pat. No. 3,654,549, which describes a device for the inductive measurement of the motion of a piston in a cylinder arranged in an injection moulding machine, GB 2 011 629 A, which shows a device for the monitoring of the operation of a piston- and cylinder unit, and EP 0 823 560 A1, which describes a hydraulic control unit comprising a position sensor.

In the four last mentioned documents, it is, thus described, how a core moves to and fro inside coils, and that one uses the relative movement between the core and the coils to get results, such as piston strokes and the motion of a piston, through inductive measurement, which shows that the basic principle to perform measurements on a core moving inside coils is also known, but applied within fields far from the field of the present invention.

SUMMARY OF THE INVENTION

The object of the present invention is to provide an improved operation device for a manual controlling of a load suspended in the operation means, which comprises a handle displaceable by the user and a sensor for the detection of the displacement and the achievement of a desired movement of the load, wherein the improvement is intended to minimize the risk that the sensor can be damaged, and also preferably to offer a better control to manually displace a load.

With an operation device of the type mentioned in the first paragraph above this object is achieved by, according to the present invention, arranging the sensor in the housing for the detection of a motion by the handle in relation to the housing and the load connection device, which sensor emits a signal corresponding to the movement of the handle from its rest position. Contrary to today's operation device with piezoelectric sensors no force is then transmitted from the handle to the inductive sensor, which eliminates the risk for damage because of overload, and which enables greater accuracy at the lifting and lowering of load, as inductive sensors can be arranged to be more sensitive than piezoelectric ones.

Suitably, the sensor comprises at least two coaxial coil components and a ferromagnetic core component coaxially movable in relation to the coils, and the coil components are fixedly connected to the housing or the handle, while the core component is fixedly connected to the handle and the housing, respectively, which enables a rugged and compact construction.

Preferably, the coil components are protectively located inside the housing, the handle provided with lateral protrusions, and the sensor part is provided with an outer end protruding from the housing and being fixedly secured to the lateral protrusion. In this way, the inductive sensor can be well protected against moisture and mechanic attacks.

In order to get a good control of the motion of the handle, it is suitable that an elongated straight guide for the handle has an end, which is fixedly attached to the housing, and a free end, which is provided with the second connection means, that the handle concentrically surrounds the guide, and that springs are arranged to keep the handle in its rest position.

The logic unit can be provided with electric current in many different ways, but suitably the housing is provided with a connector for the connection of an electric cable, which connector is connected to the control unit. A connector gives the same reliability as a cable entering into the housing through a sealing, but allows a quicker and simpler exchange of an operation device in a lifting device, if desired.

Suitably, the guide for the handle is tubular, for the through-connection of electric cables and/or transport of e.g. pressurized air from one point to another.

In a preferred embodiment, the housing is provided with an inlet for pressurized air. The supplied pressurized air can then be brought through the tubular guide to the second connection means, which can be designed for a connection to vacuum gripping means controlled by the control unit and driven by the pressurized air.

Alternatively, the second connection device can be designed for the connection to an electromagnetic gripping device supplied with current and controlled by the control unit.

In those cases neither vacuum gripping device nor electromagnetic gripping device are suitable to use, it is, of course, possible to use a mechanic gripping means, e.g. a hook.

Preferably, the first connection means, the connector and the inlet for pressurized air are connected to the housing via a swivel. In this way, the housing and the load carried by the housing can be rotated freely in the horizontal plane without risking tangle of wires and cables.

Suitably, the swivel is a mechanic, electric and pneumatic swivel, which thus is able to transmit lifting force, electricity and air flow. Preferably, the swivel is such one, which is described in our Swedish patent application SE-1351174, which is herewith incorporated as a reference.

BRIEF DESCRIPTION OF THE DRAWINGS

Below the invention will be described more in detail with reference to the preferred embodiments and the enclosed drawings, of which.

DETAILED DESCRIPTION OF THE INVENTION

Figure 1:
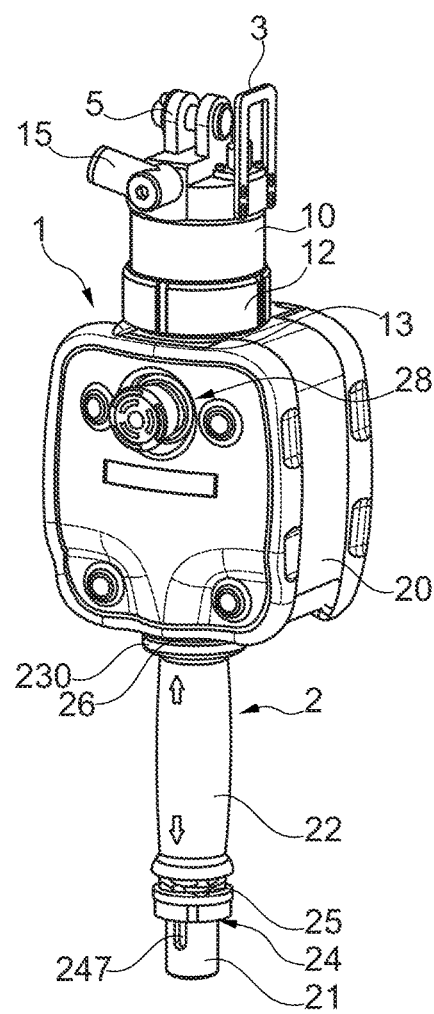
FIG. 1 shows an operation device according to the invention, connected with a swivel.

FIG. 1 shows a swivel 1 according to the invention, connected in its lower end to an operation device 2. The swivel 1 comprises a static portion 10, 12 and a rotating portion 13, which is essentially surrounded by the static portion 10, 12. The operation device 2 is with its upper housing-shaped part 20 fixed to a lower end of the rotatable portion 13 of the swivel, which portion is inserted into the housing 20 from above. Further, an inlet part 15 for e.g. pressurized air is shown, which inlet part is arranged in the upper end of the swivel, and a cabling 3 is outlined.

At the use of the invention, the device 1, 2 is hung up by attaching it in e.g. a wire to a lifting arm (not shown) in the suspension device (also referred to as the first connection device) 5 of the swivel. A medium source, e.g. pressurized air, is connected to the inlet part 15 for a flow there through and further down through the swivel 1 to the operation device 2. Further, e.g. an 8-pole electric cable 3 is connected to the swivel 1, wherein the electric transmission takes places via brushes against rings/strips (not shown) and in this way the electric transmission takes place from the outer fixed parts 10, 12 to the rotary inner part 13 and its cabling coupling, where an electric cable (not shown) from the operation device 2 is connected, in a manner known per se.

In this manner, both a pneumatic (via a second connection device 21) and an electric transmission is performed through the swivel 1, which implies that no cables/wires, etc. run the risk to be damaged, and the operation device can without any limitation be rotated in all possible directions without any muddle. Further, the swivel according to the invention is extra compact as the housing 20 is load carrying.

Figure 2:
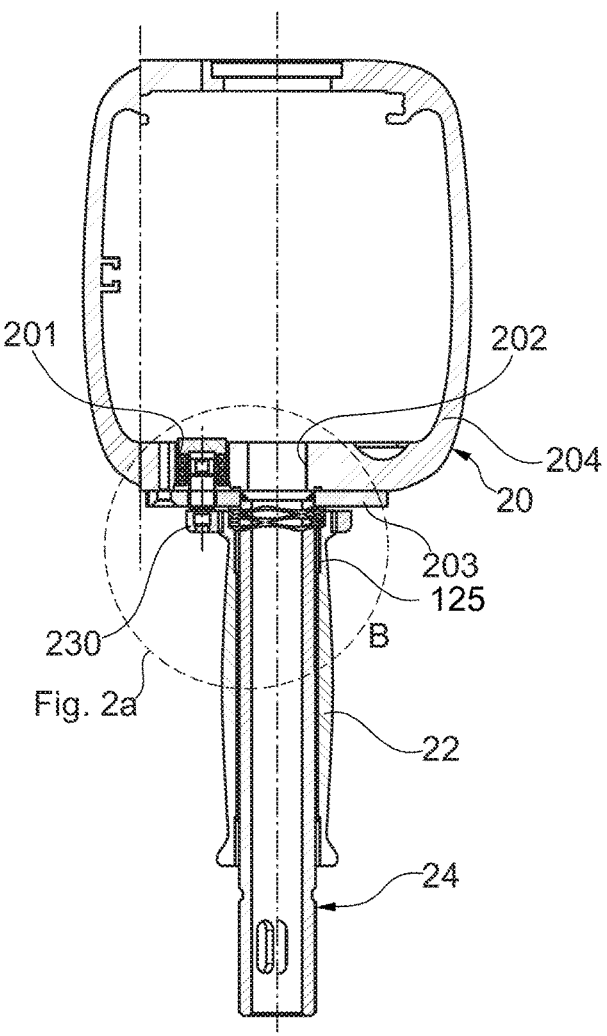
FIGS. 2 and 2a show a cross-cut and a part, respectively, of an operation device according to the invention.
Figure 2A:
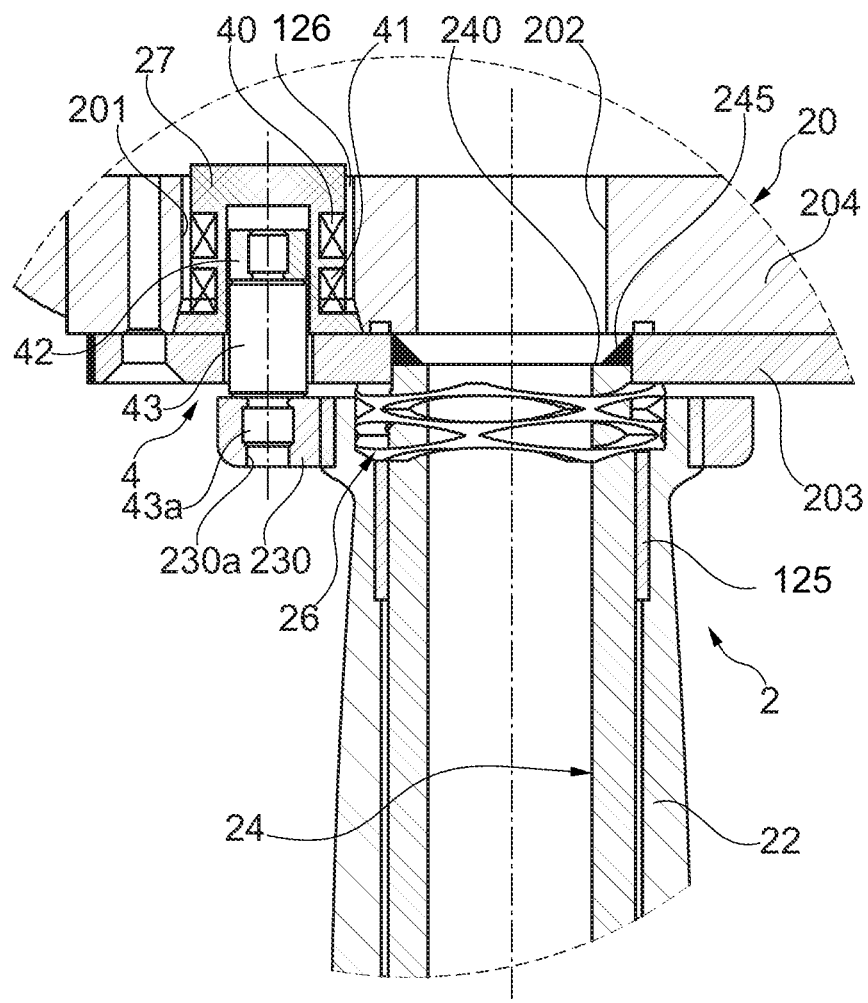

FIG. 2 shows a cross-cut of parts included in an operation device 2 according to the invention. At the top of the figure, parts of the housing 20 are shown, which are connected to the operation handle 22. At the bottom of the housing there are two through-holes 201, 202. One through-hole 201 is the inlet opening for the arrangement of a sensor 4 according to the invention, and the other through-hole 202 is, partly an opening for enabling passage of an electric cable through the housing 20, partly also as a passage for pressurized air and/or hydraulic oil.

At the other through-hole 202 a guide device 24 is arranged, which comprises a tube 24, which, by a ring attachment 245, in a sealing manner is fixed with its upper part 240 to the bottom of the housing 20, preferably by a plate 203, which is sealingly screwed from below against the main frame 204 of the housing 20. An operation handle 22 is movably arranged at the outside of the tube 24. A sliding bearing 125 facilitates that the operation handle 23 can be moved along the tube 24, essentially without any friction. An upper spring 26 and a corresponding lower spring 25, respectively, are arranged at the respective end of the operation handle 22, so that the operation handle 22 in an uninfluenced position takes a position between an upper end position and a lower end position, between which the handle 22 can be displaced along the tube 24.

At the upper end of the operation handle there is a lateral protrusion 230 with a recess 230a intended for the attachment of a movable sensor part 43 included in a sensor 4. A lower end 43a of the movable sensor part 43 is thus fixed inside the lateral protrusion 230. The movable sensor part 43 is in the vicinity of its upper end provided with an iron core 42. The movable sensor part 43 projects through the opening 201 in the bottom of the housing into a cavity 26 inside the housing 20. In region of the outer periphery of the cavity 26 a fixed sensor body 27 is arranged with two, or more, coaxial coils 40, 41, which are connected to a logic unit 28, which in its turn interacts with the control unit (not shown). The movable part 43 of the sensor 4 is positioned in such a manner that when the operation handle 23 is in its inactive position, i.e. in a central position between the upper and lower end positions, the iron coil 42 in the movable part 43 will be positioned in a central position in relation to the coaxial coils 40, 41 and with a radial air gap between the movable part 43 and the coils 40, 41.

The coils 40, 41 are connected in series and fed with a sinusoidal alternating voltage. When the iron core 42 at the movable sensor body 43 is displaced in relation to the coils 40, 41, the impedance in the circuit will be changed. By means of this impedance change a very exact determination can be achieved by the position of the operation handle in relation to its zero position. Thus, by means of the arrangement described above, very exact control signals can be fed to the control system for the activation of the lifting means. Thanks to the arrangement this can be achieved without any real force transmission from the operator's hand motion to the sensor 4, as the measurement inside the sensor is achieved without contact.

Figure 3:
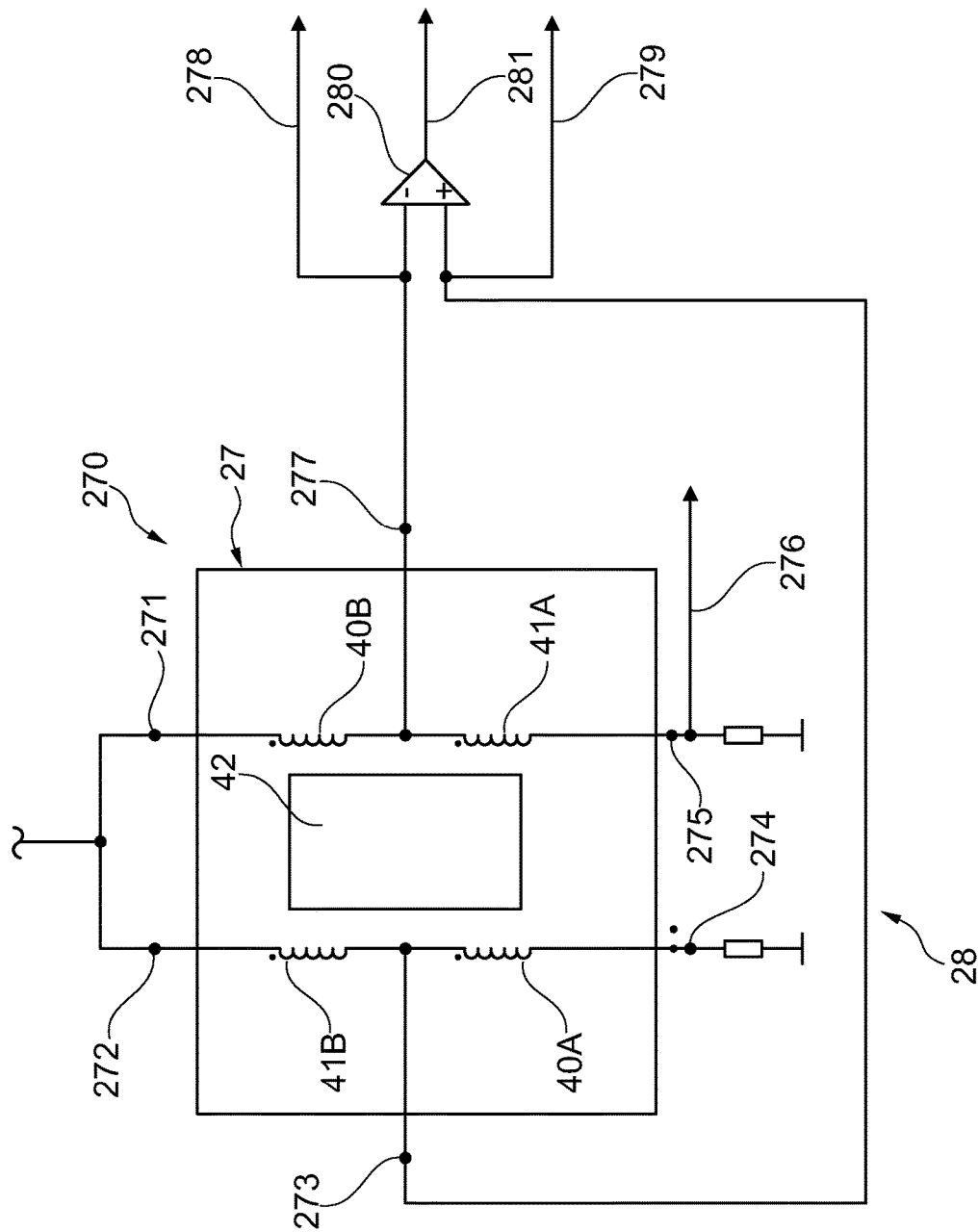
FIG. 3 shows a bridge circuit according to a preferred embodiment of connecting the coils for control of the sensor unit.

In FIG. 3 there is shown a schematic view of a circuitry within the logic unit 28 in the house 20. There is shown a bridge circuit 270 presenting a preferred sensor arrangement to control the operation of the lifting unit 2, i.e. being connected to the control unit (not shown). There is schematically shown the moveable core 42 which is fixedly connected to the handle 22 and moveably arranged within the coils 40A-B, 41A-B (here shown schematically besides). As shown in the preferred embodiment four coils are used, two coils 40A, 40B in an upper coil set 40 and two coils 41A, 41B in a lower coil set 40. In a preferred embodiment these coils are arranged to form one unit each 40 and 41 respectively, attached to the fixed sensor body 27. In FIG. 3 there is shown a schematic view depicting a circuit board (PCB) 280 which is connected to connection lines of the bridge circuit 270 as indicated by dots, i.e. connection points. As evident for the skilled person the circuit board (PCB) 280, not shown in any detail, may be equipped with various electronic elements to achieve a desired functionality, whereof merely some elements are presented in FIG. 3.

The four coils 40A-B, 41A-B are connected to a power input at one end with alternate voltage connecting a first feed line via a first connection point 272 with the first 40A and the second 41B coils in series and second feed line via a second connection point 271 connecting third 40B and fourth 41A coils in series, respectively. The feed lines are connected to ground via third 274 and fourth 275 connection points and via appropriate resistance. From a connection point between the first coils 40A, 41B in series, there is a third connection line, that via a fifth connection point 273 leads to a differential amplifier 280. From the opposite side there is a corresponding fourth connection line that via a sixth connection point 277 also leads to the differential amplifier 280. A control signal 281 is being transmitted from the differential amplifier 280 to the control unit (not shown). Thanks to the design a very accurate control may be achieved. Further, thanks to additional control signals 276, 278, 279 that are transmitted to the control unit from the circuitry 270 the operational status (e.g. possible short circuitry, malfunction in coil, etc) sensor unit 4 may be continuously monitored by means of further connection points 273, 275, 277 that may sense that the current levels are within predetermined levels. One 273 between the first 40A and the second 41B coils, one 277 between the third 40B and fourth 41A coils and one 275 between the fourth coil 41A and ground.

The invention is not limited to the above description but can be varied within the scope of the claims. For instance, the man skilled in the art realizes that the guide 24 must not necessarily be shaped as a tube but that also a solid unit, e.g. with cable channels for an electromagnetic lifting means, can be used. Further, it is realized that the arrangement of coils and iron core, respectively, can be inverted, i.e. the coils can be moveable together with the handle.

The invention claimed is:

1. An operation device for a manual control of a load suspended by the operation device comprising:
   a) a housing configured for suspending the load;
   b) a first connection means, at least indirectly carried by the housing, for the connection of the operation device to a lifting device for the lifting and lowering of the operation device with the load;
   c) a second connection device, at least indirectly carried by the housing, for the connection of the operation device to the load;
   d) a handle, which is movably arranged in relation to the housing and the second connection device and which has a rest position between two end positions;
   e) a sensor arranged inside the housing for the detection of a motion by the handle in relation to the housing and the second connection device, which sensor emits a signal corresponding to the movement of the handle from its rest position; and
   f) a control unit for receiving the signal and as a result thereof control the lifting and lowering of the operation device with the load, wherein said sensor is an electromagnetic induction sensor comprising more than two coaxial coil components and a ferromagnetic core component, which is coaxially movable in relation to the coil components.

2. The operation device according to claim 1, wherein the coil components are fixedly connected to the housing and the core component is fixedly connected to the handle and the housing, respectively.

3. The operation device according to claim 2, wherein the coil components are located inside the housing, that the handle has a lateral protrusion, and that the core component is arranged at an elongated body with an outer end protruding from the house and is fixedly secured to the protrusion.

4. The operation device according to claim 2, wherein the coil components, by means of a separate body, are located inside the housing, that the handle has a lateral protrusion, and that the core component is arranged at an elongated body with an outer end protruding from the house and is fixedly secured to the protrusion.

5. The operation device according to claim 1, wherein an elongated guide for the handle has an upper end, which is fixedly attached to the housing, and a lower end, which is provided with the second connection device, that the handle concentrically surrounds the guide, and that springs are arranged to keep the handle in its rest position.

6. The operation device according to claim 5, wherein the housing is provided with a connector for the connection of an electric cable, which connector is connected to a logic unit.

7. The operation device according to claim 6, wherein the guide for the handle is provided with a tubular portion, a fluid inlet for supplying a fluid to the housing, and that the second connection device is designed for the connection of a driving means controlled by the control unit and driven by the fluid.

8. The operation device according to claim 7, wherein the first connection means is connected to the housing via a swivel.

9. The operation device according to claim 7, wherein the first connection means, the connector and the fluid inlet are connected to the housing via a swivel.

10. The operation device according to claim 8, wherein the swivel is a mechanical, electric and/or pneumatic swivel.

11. The operation device according to claim 6, wherein the second connection device is designed for the connection to electromagnetic gripping means supplied with current and controlled by the control unit.

12. The operation device according to claim 6, wherein the guide for the handle is provided with a tubular portion, a fluid inlet for supplying a fluid to the housing, and that the second connection device is designed for the connection of a driving means, a vacuum gripping means, controlled by the control unit and driven by the fluid.

13. A method for the manual control of a load suspended by an operation device, which method comprises:
   a) providing an operation device comprising:
      a housing configured for suspending the load;
      a first connection device, at least indirectly carried by the housing, for the connection of the operation device to a lifting device for the lifting and lowering of the operation device with the load;

a second connection device, at least indirectly carried by the housing, for the connection of the operation device to the load;

a handle, which is movably arranged in relation to the housing and the second connection device and which has a rest position between two end positions;

a sensor arranged inside the housing for the detection of a motion by the handle in relation to the housing and the second connection device, which sensor emits a signal corresponding to the movement of the handle from its rest position; and a control unit for receiving the signal and as a result thereof controlling the lifting and lowering of the operation device with the load, wherein said sensor comprises an electromagnetic inductance;

b) connecting the operation device to the lifting device by the first connection device;

c) connecting the operation device to the load by the second connection device; and d) moving the handle to control the lifting or lowering of the operation device with the load.

14. The method according to claim 13, further comprising supplying a fluid to the the housing through a fluid inlet on the housing and driving a driving means by the fluid, the driving means is connected to the second connection device and controlled by the control unit.

15. The method according to claim 14, wherein a driving means and a vacuum gripping means are connected to the second connection device, and the method further comprises controlling the driving means and the vacuum gripping means by the control unit and driving the driving means and the vacuum gripping means by the fluid.

16. The method according to claim 14, wherein the fluid is pressurized air.

17. The method according to claim 15, wherein the fluid is pressurized air.

18. The method according to claim 13, wherein an electromagnetic gripping means is connected to the second connection means and the method comprises controlling the electromagnetic gripping means by the control unit.

* * * * *